US012684461B2

(12) United States Patent
Borkar et al.

(10) Patent No.: US 12,684,461 B2
(45) Date of Patent: Jul. 14, 2026

(54) RESTRICT MOBILE TO MOBILE COMMUNICATION DYNAMICALLY IN 5G USER PLANE FUNCTION

(71) Applicant: Cisco Technology, Inc., San Jose, CA (US)

(72) Inventors: Gautam Mohanlal Borkar, Redmond, WA (US); Anthony Maswan Fajri, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 18/612,600

(22) Filed: Mar. 21, 2024

(65) Prior Publication Data

US 2025/0301396 A1 Sep. 25, 2025

(51) Int. Cl.
| | |
|---|---|
| *H04W 8/18* | (2009.01) |
| *H04W 8/26* | (2009.01) |
| *H04W 12/06* | (2021.01) |
| *H04W 12/08* | (2021.01) |
| *H04W 12/12* | (2021.01) |
| *H04W 12/76* | (2021.01) |
| *H04W 48/08* | (2009.01) |
| *H04W 60/00* | (2009.01) |

(52) U.S. Cl.
CPC ............. *H04W 48/08* (2013.01); *H04W 8/26* (2013.01); *H04W 12/08* (2013.01); *H04W 60/00* (2013.01)

(58) Field of Classification Search
CPC ....... H04W 48/08; H04W 8/26; H04W 12/08; H04W 60/00

USPC ......................................................... 455/411
See application file for complete search history.

(56) References Cited

U.S. PATENT DOCUMENTS

| | | | |
|---|---|---|---|
| 2020/0280822 A1* | 9/2020 | Stammers | ........... H04L 67/1021 |
| 2020/0366639 A1* | 11/2020 | Saidumuhamed | .. H04L 12/4633 |
| 2020/0374143 A1 | 11/2020 | Mukherjee et al. | |
| 2021/0185752 A1 | 6/2021 | Samuel et al. | |
| 2021/0219179 A1* | 7/2021 | Narath | .................. H04W 76/10 |
| 2021/0250852 A1 | 8/2021 | Huang et al. | |
| 2023/0412497 A1 | 12/2023 | Dhammawat et al. | |

OTHER PUBLICATIONS

IP.com search History (Year: 2026).*

* cited by examiner

*Primary Examiner* — Moustapha Diaby
(74) *Attorney, Agent, or Firm* — Polsinelli P.C.

(57) ABSTRACT

In one aspect, a method includes generating, using a User Plane Function (UPF) of a core element of a network, a query to retrieve information associated with one or more Data Network Names (DNNs) configured in at least one other UPF in the network; transmitting the query to a Network Repository Function (NRF); receiving a response from the NRF, the response including IP address subnets of the at least one other UPF associated with the one or more DNNs; dynamically generating an Access Control List (ACL) to block mobile-to-mobile communication between User Equipment (UEs) in the network, using the IP address subnets received as part of the response, wherein each of the UEs is assigned an IP address from among the IP address subnets; and blocking M2M communication using the ACL dynamically generated.

20 Claims, 10 Drawing Sheets

150

CLOUD 102

Fog Nodes 162 162 ∘ ∘ ∘ 162

164

Fog

162

162 162

162

158

160

Fog

162

162

162

164

THE CLOUD LAYER 154

THE FOG LAYER 156

CLIENT ENDPOINTS LAYER 116

152

152

152

RESTRICT MOBILE TO MOBILE COMMUNICATION DYNAMICALLY IN 5G USER PLANE FUNCTION

FIELD OF DISCLOSURE

The subject matter of this disclosure relates in general to the field of computer networking, and more particularly, to reducing the complexity associated with restricting mobile-to-mobile communications in a mobile core deployment.

BACKGROUND

Fifth generation (5G) mobile and wireless networks provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

In 5G mobile core deployments, restricting Mobile to Mobile communication is usually part of a network security requirement.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
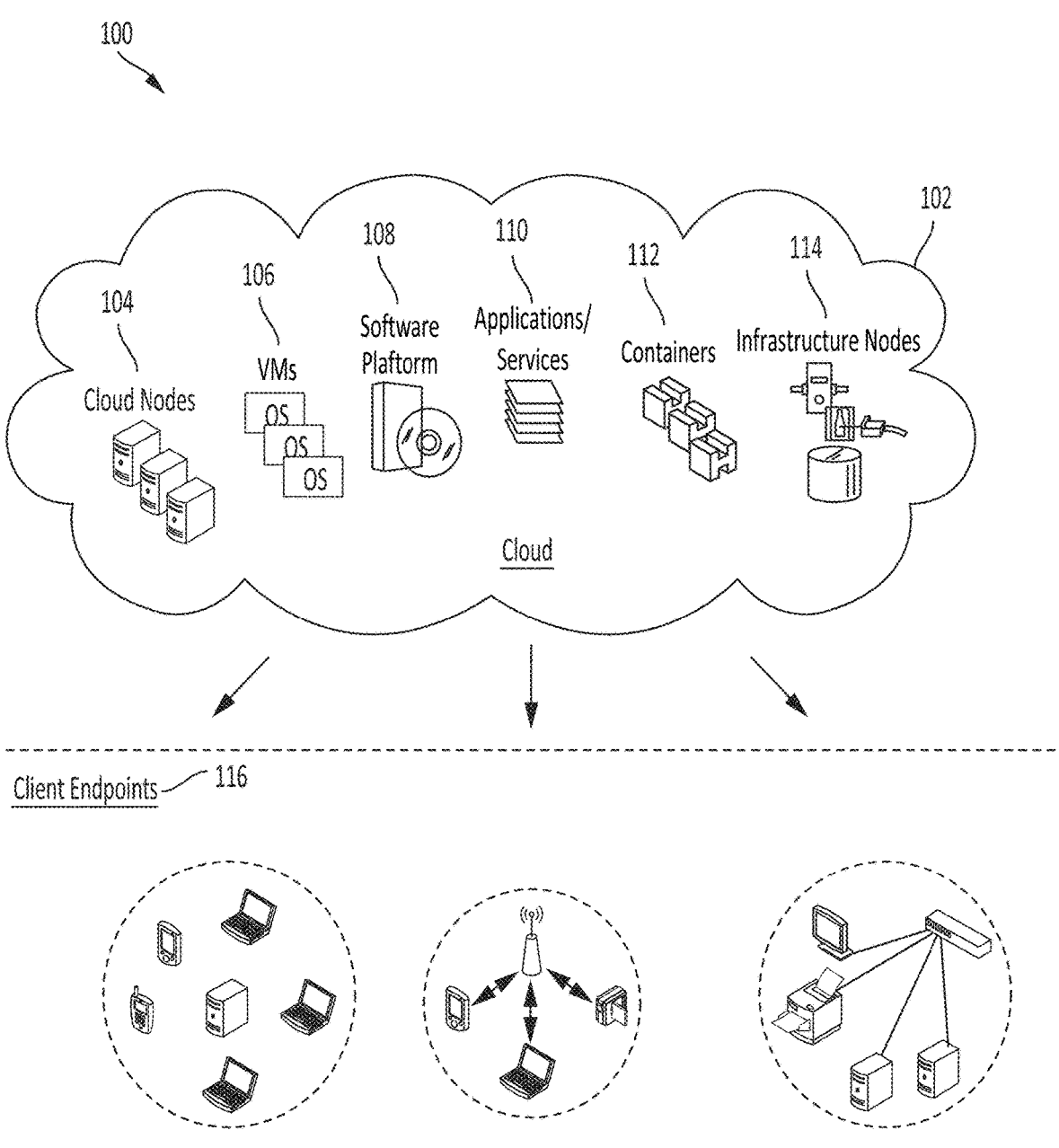
FIG. 1A illustrates an example cloud computing architecture, according to some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

As will be described below, aspects of the present disclosure are directed to managing mobile-to-mobile (M2M) communication for Internet of Things (IoT) devices in a 5G network. More specifically, the present disclosure is directed to dynamic creation of access control lists at a 5G User Plane Function (UPF) for managing M2M communications by utilizing mobile IP address subnet of all UPFs available at Network Repository Function (NRF).

In one aspect, a method includes generating, using a User Plane Function (UPF) of a core element of a network, a query to retrieve information associated with one or more Data Network Names (DNNs) configured in at least one other UPF in the network; transmitting the query to a Network Repository Function (NRF); receiving a response from the NRF, the response including IP address subnets of the at least one other UPF associated with the one or more DNNs; dynamically generating an Access Control List (ACL) to block mobile-to-mobile communication between User Equipment (UEs) in the network, using the IP address subnets received as part of the response, wherein each of the UEs is assigned an IP address from among the IP address subnets; and blocking M2M communication using the ACL dynamically generated.

In another aspect, the method further includes configuring the one or more DNNs on the UPF when the UPF is not registered with the NRF.

In another aspect, the method further includes adding the one or more DNNs to the UPF after registering the UPF with the NRF.

In another aspect, the method further includes updating the NRF with information associated with the one or more DNNs.

In another aspect, the method further includes subscribing to the NRF to receive notifications of at least one modification to UPFs associated with the one or more DNNs; and receiving a notification from the NRF, the notification being one of a registration notification of a new UPF associated with the one or more DNNs or a deregistration notification of an existing UPF associated with the one or more DNNs.

In another aspect, the ACL is generated based on the response and the notification.

In another aspect, the UPF subscribes to the NRF to receive the notifications using NFStatusSubscribe service to receive the registration notification and the deregistration notification In one aspect, a network component configured to implement User Plane Function (UPF) of a 5G network includes one or more memories having computer-readable instructions stored therein, and one or more processors configured to execute the computer-readable instructions to generate a query to retrieve information associated with one or more Data Network Names (DNNs) configured in at least one other UPF in the 5G network; transmit the query to a Network Repository Function (NRF); receive a response from the NRF, the response including IP address subnets of the at least one other UPF associated with the one or more DNNs; dynamically generate an Access Control List (ACL) to block mobile-to-mobile communication between User Equipment (UEs) in the 5G network, using the IP address subnets received as part of the response, wherein each of the UEs is assigned an IP address from among the IP address subnets; and block M2M communication using the ACL dynamically generated.

In another aspect, one or more non-transitory computer-readable media include computer-readable instructions, which when executed by one or more processors of a network component configured to implement User Plane Function (UPF) of a 5G network, cause the network component to generate a query to retrieve information associated with one or more Data Network Names (DNNs) configured in at least one other UPF in the 5G network; transmit the query to a Network Repository Function (NRF); receive a response from the NRF, the response including IP address subnets of the at least one other UPF associated with the one or more DNNs; dynamically generate an Access Control List (ACL) to block mobile-to-mobile communication between User Equipment (UEs) in the 5G network, using the IP address subnets received as part of the response, wherein each of the UEs is assigned an IP address from among the IP address subnets; and block M2M communication using the ACL dynamically generated.

DETAILED DESCRIPTION

FIG. 1A illustrates an example cloud computing architecture, according to some aspects of the present technology. FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications (or services) 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an Internet-of-things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
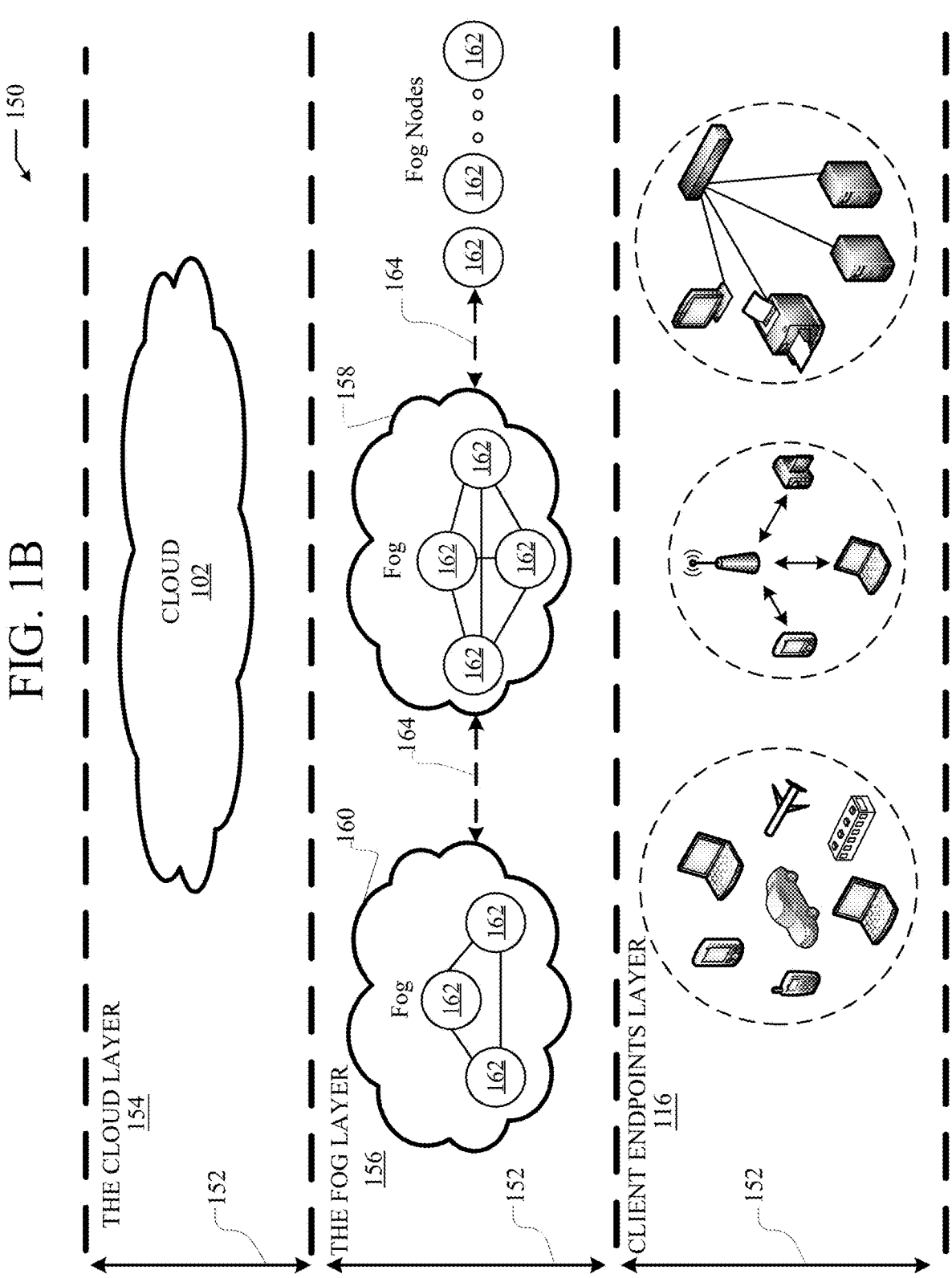
FIG. 1B illustrates an example fog computing architecture, according to some aspects of the present technology.

FIG. 1B illustrates an example fog computing architecture, according to some aspects of the present technology.

FIG. 1B illustrates a diagram of an example fog computing architecture 150. The fog computing architecture 150 can be incorporated into the cloud computing architecture as described in FIG. 1A. Accordingly, the fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116, as a part of a TCP connection, accessed through the TCP connection, can include an initiator or a receiver of a TCP connection and be utilized by the initiator or the receiver to transmit and/or receive data through the TCP connection.

The fog layer 156 or "the fog" provides the computation, storage, and networking capabilities of traditional cloud networks, but closer to the endpoints. The fog can thus extend the cloud 102 to be closer to the client endpoints 116, and provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc, and be deployed within fog instances 158, 160. For example, the fog instances 156, 158 can be a regional cloud or data center, a local area network, a network of fog nodes 162, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc. Moreover, one or more of the fog nodes 162 can be interconnected with each other via links 164 in various topologies, including star, ring, mesh, or hierarchical arrangements, for example.

In some cases, one or more fog nodes 162 can be mobile fog nodes. The mobile fog nodes can move to different geographic locations, logical locations, or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location.

Figure 2A:
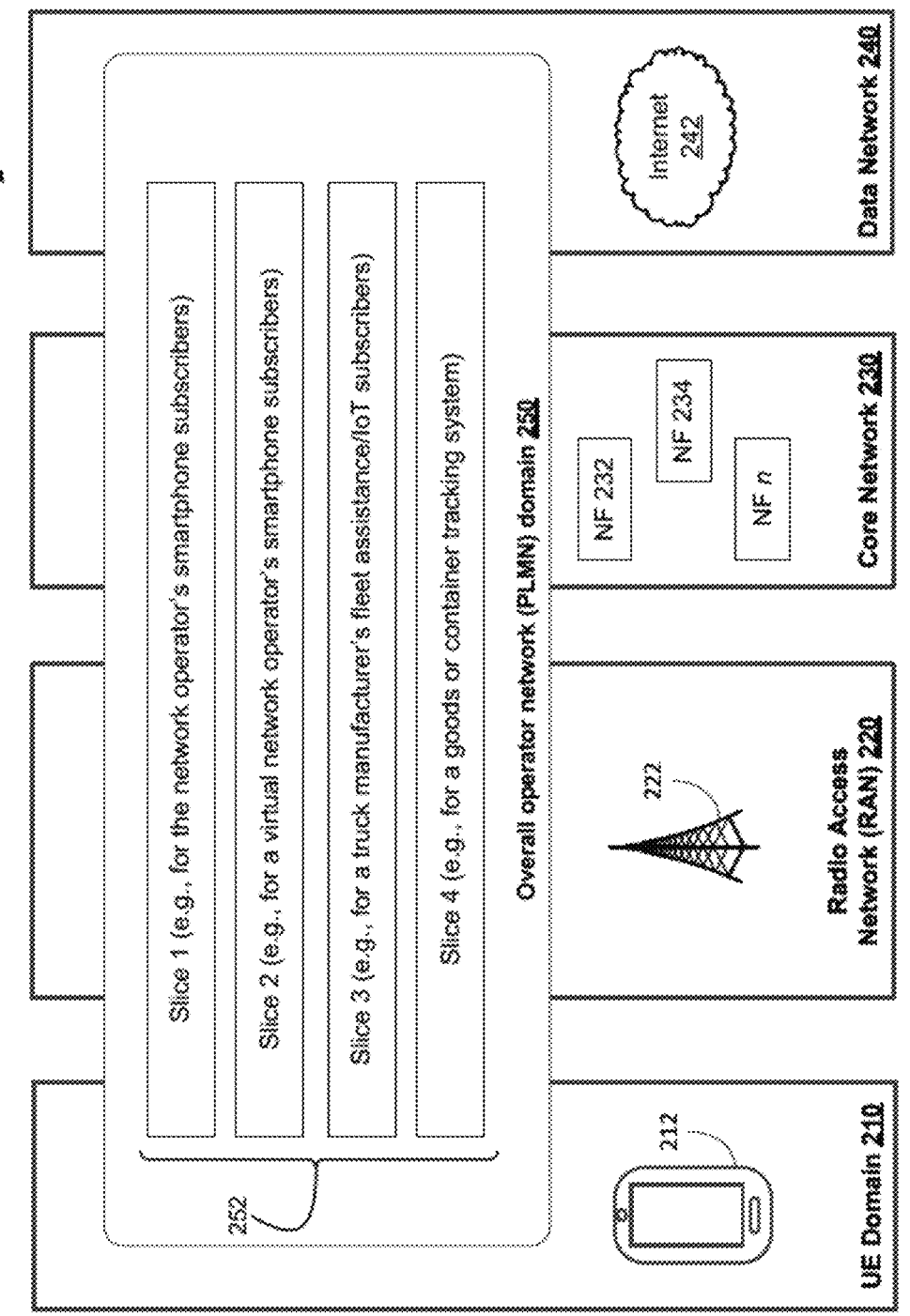
FIG. 2A depicts an example schematic representation of a 5G network environment in which network slicing has been implemented, according to some aspects of the present technology.

FIG. 2A depicts an example schematic representation of a 5G network environment in which network slicing has been implemented, according to some aspects of the present technology. In some examples, the 5G network environment 200 can be utilized to implement the cloud 102 of FIG. 1A and/or the fog computing architecture 150 of FIG. 1B.

As illustrated, network environment 200 is divided into four domains, each of which will be explained in greater depth below; a User Equipment (UE) domain 210, e.g. of one or more enterprises, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g., to users in the UE domain 210.

In some example embodiments, core network 230 is a 5G core network (5GC) in accordance with one or more accepted 5GC architectures or designs, or an Evolved Packet Core (EPC) network, which combines aspects of the 5GC with existing 4G networks. Core Network 230 contains a plurality of Network Functions (NFs), shown here as NF 232, NF 234 . . . NF n, which executes in a control plane of core network 230. The NFs are configured to provide a service-based architecture in which a given NF allows any other authorized NFs to access its services across any of the network slices 252 or as a unique instance. The plurality of NFs of the core network 230 includes one or more of Access and Mobility Management Functions (AMF) (typically used when core network 230 is a 5GC network); Mobility Management Entities (MME) (typically used when core network 230 is an EPC network); User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs).

In some example embodiments, an AMF/MME can be common to or otherwise shared by multiple slices of the plurality of network slices 252, and in some example embodiments an AMF/MME can be unique to a single one of the plurality of network slices 252. In some examples, the NFs can include a Session Management Function (SMF) that controls session establishment, modification, release, etc., and in the course of doing so, provides other NFs with access to these constituent SMF services.

Various other NFs can be provided without departing from the scope of the present disclosure, as would be appreciated by one of ordinary skill in the art.

Across the four domains of the 5G network environment 200, an overall operator network domain 250 is defined. The operator network domain 250 is in some example embodiments a Public Land Mobile Network (PLMN), a private 5G network and/or a 5G enterprise network, and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g., SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

Within the scope of the 5G mobile and wireless network architecture, a network slice comprises a set of defined features and functionalities that together form a complete Public Land Mobile Network (PLMN), a private 5G network and/or a 5G enterprise network for providing services to UEs. This network slicing permits for the controlled composition of the 5G network with the specific network functions and provided services that are required for a specific usage scenario. In other words, network slicing enables a 5G network operator to deploy multiple, independent 5G networks where each is customized by instantiating only those features, capabilities and services required to satisfy a given subset of the UEs or a related business customer needs.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises, to facilitate efficient management of SaaS provisioning to the enterprises.

Figure 2B:
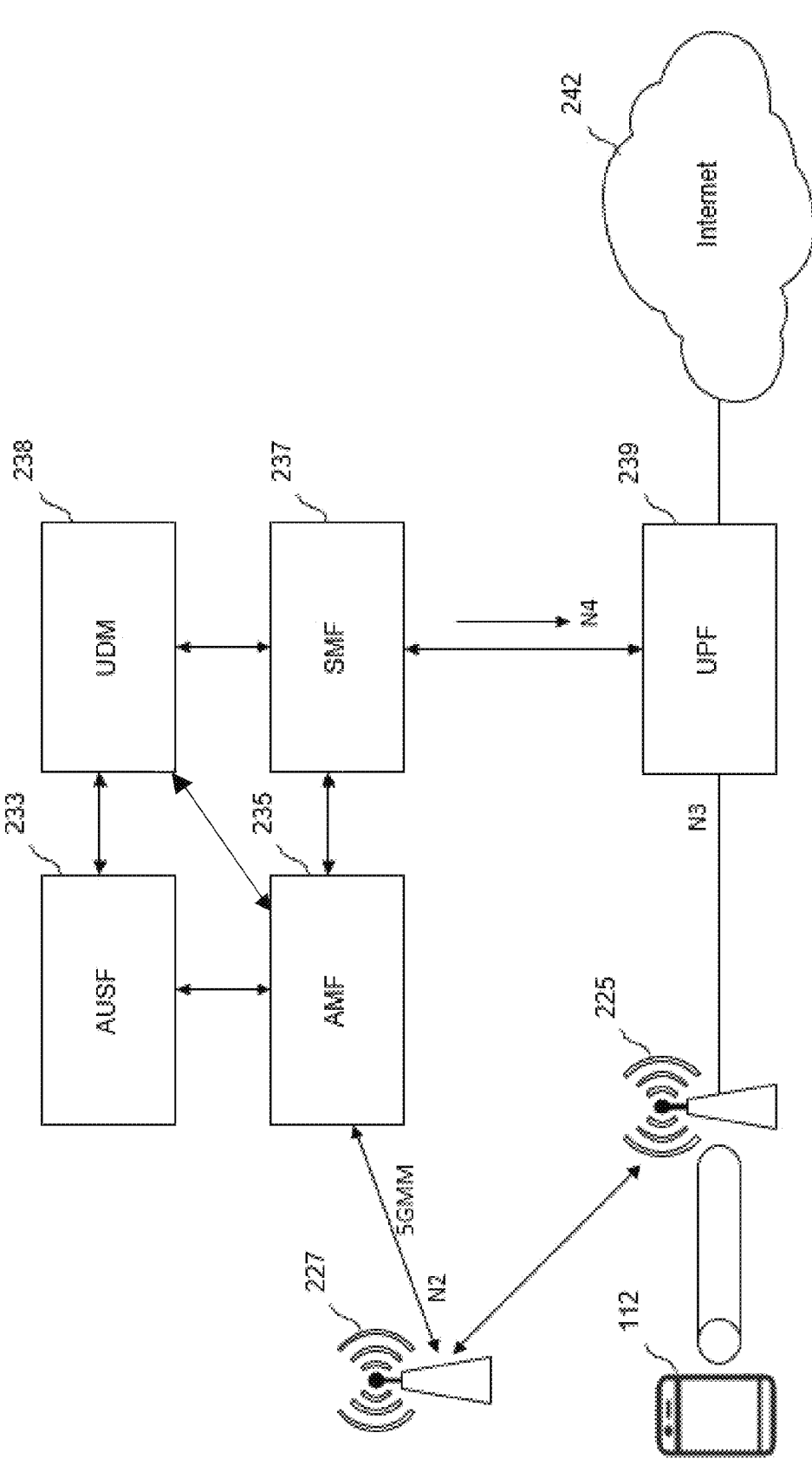
FIG. 2B illustrates an example 5G network architecture, according to some aspects of the present technology.

FIG. 2B illustrates an example 5G network architecture, according to some aspects of the present technology. As addressed above, a User Equipment (UE) 212 can connect to a radio access network provided by a first gNodeB (gNB) 225 or a second gNB 227.

The gNB 225 can communicate over a control plane N2 interface with an access mobility function (AMF) 235. AMF 235 can handle tasks related to network access through communication with a unified data management (UDM) function 238. Collectively AMF 235 and UDM 238 can determine whether a UE should have access and if any parameters related to the access should be applied. Accordingly, the AMF 235 utilizes the UDM 238 to retrieve any access-based information or restrictions of the UE 212. AMF 235 also works with AUSF 233 to handle authentication and re-authentication of the UE 212 as it moves between access networks. The AUSF and the AMF could be separated or co-located.

Assuming AMF 235 determines the UE 212 should have access to a user plane to provide voice or data communications, AMF 235 can select one or more service management functions (SMF) 237. SMF 237 can configure and control one or more user plane functions (UPF) 239. AUSF 233 can provide a security key to SMF 237 for use in encrypting control plane communications between the SMF 237 and the gNB 225 (or 227), via the UPF. For example, the SMF 237 can configure UPF 239, acting as a router, with traffic classification rules and traffic policies for the IP address.

As noted above SMF 237 can configure and control one or more user plane functions (UPF) 239. SMF 237 communicates with UPF 239 over an N4 Interface which is a bridge between the control plane and the user plane. SMF 237 can send PDU session management and traffic steering and policy rules to UPF 239 over the N4 interface. UPF 239 can send PDU usage and event reporting to SMF 237 over the N4 interface, and also communicate user plane data or voice over the N3 interface back to UE 212 through gNB 225.

As noted above, in a 5G mobile core deployment, restricting M2M communication is usually part of security requirement. For internet facing use case where the destination is always a public IP address, using Access Control List (ACL) to block M2M communication is the prevalent solution.

In the context of IoT, customers of a 5G network with IoT devices to manage, may operate an application server with a private IP. Implementing a traditional ACLs to prevent M2M communication for IoT devices can be complex, particularly when dealing with unstructured mobile IP address ranges within a service provider network that cannot be summarized. In other words, number of ACLs will increase exponentially depending on number of un-summarized IP subnet. Therefore, the more IP subnets to handle, the higher will be the number of ACLs needed due to full mesh access list configuration. Also, maintaining access list configuration across all UPFs is tedious operational procedure and time consuming.

Figure 3:
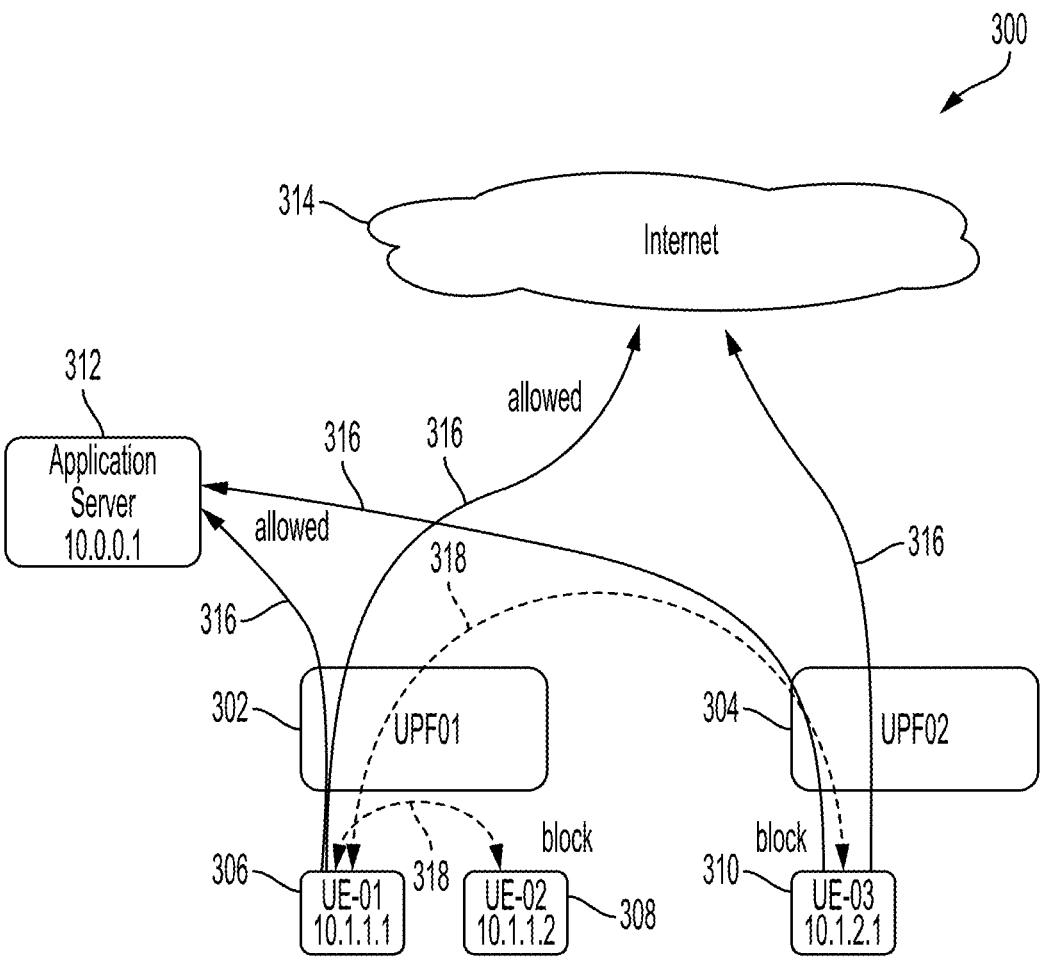
FIG. 3 shows a simplified example of number of possible M2M communications in a mobile network with IoT devices, according to some aspects of the present disclosure.

FIG. 3 shows a simplified example of number of possible M2M communications in a mobile network with IoT devices, according to some aspects of the present disclosure. Example system 300 may include one or more UPFs such as UPF 302 and UPF 304. Multiple UEs (which can be IoT devices) such as UE 306 and UE 308 connected to UPF 302 and UE 310 connected to UPF 304. Application server 312 may be used for management of IoT devices with a given IP address (e.g., 10.0.0.1). One can readily observe that use of ACLs will become challenging as communications between UEs 306, 308, and 310 (each having a unique IP address as shown in FIG. 3) and application server 312 and/or Internet 314 (shown using arrows 316) must be allowed while M2M communication (shown using arrows 318) between UEs 306, 308, and/or 310 must be blocked. As noted, such ACLs must be maintained by both UPFs 302 and 304. The list of ACLs to be maintained across all UPFs will only grow as the number of UEs, UPFs, and/or application servers grow. Examples described hereinafter with reference to FIGS. 4-7 address the challenges associated with blocking M2M communications by using NRF to maintain mobile IP address subnet of all UPFs in order for each UPF to dynamically create a corresponding ACL based on the mobile IP addresses provided by NRF and apply the same to traffic (data packets) to and/or from connected UEs.

In describing example embodiments for dynamic ACL creation for purposes of restricting M2M communications, there are three example scenarios, each of which will be described below with reference one of FIGS. 4-6.

Figure 4:
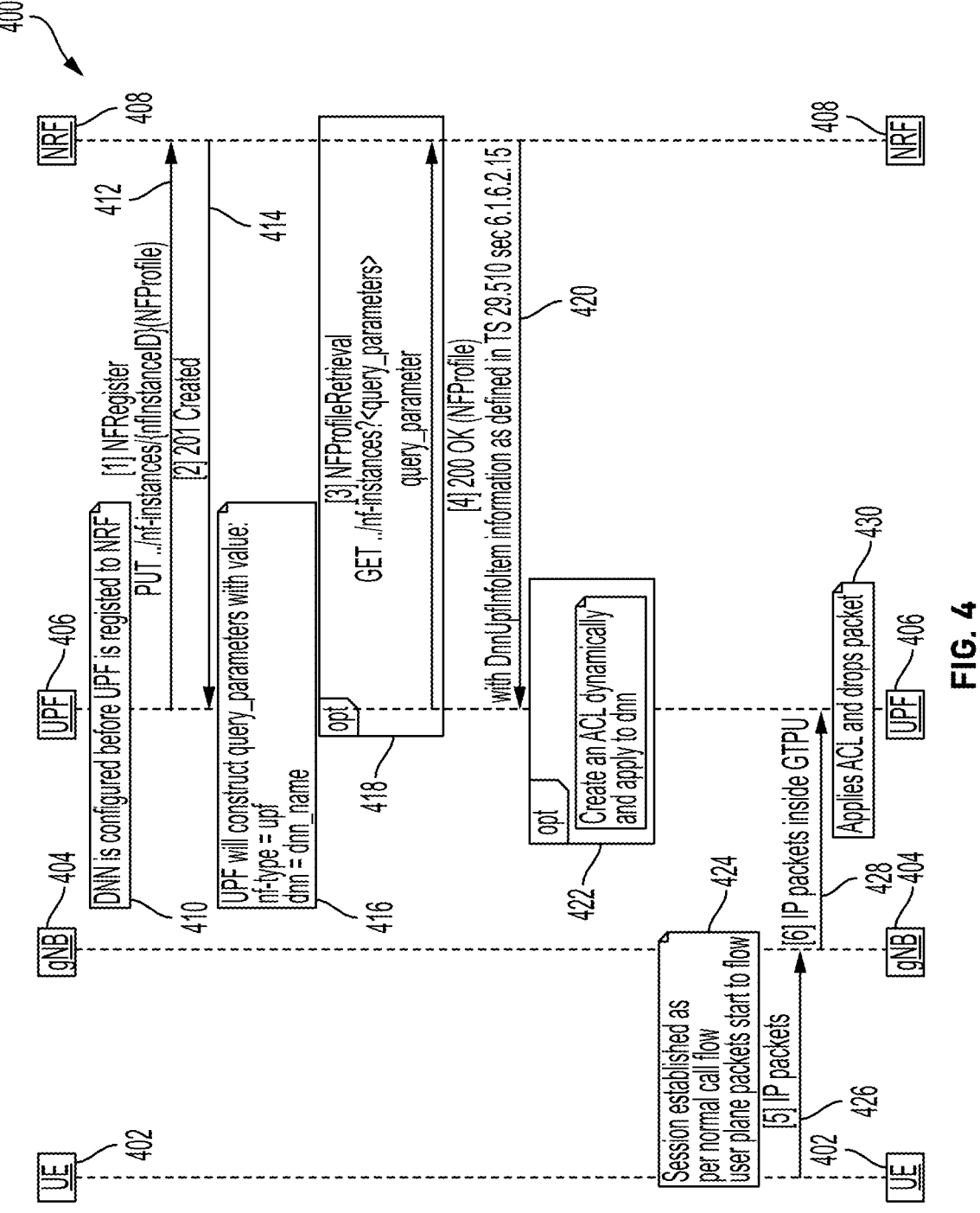
FIG. 4 illustrates dynamic ACL generation when DNN is configured in a 5G core before UPF registration with a 5G NRF, according to some aspects of the present disclosure.

FIG. 4 illustrates dynamic ACL generation when DNN is configured in a 5G core before UPF registration with a 5G NRF, according to some aspects of the present disclosure.

Example flow 400 illustrates various steps between UE 402, access point (e.g., gNB 404), UPF 406 and NRF 408. UE 402 can be any end device connected to a 5G network including, but not limited to, any known or to be developed IoT device. Steps of example flow 400 will be described next.

At step 410, Data Network Name (DNN) is configured on UPF 406 before UPF 406 registers with NRF 408. This configuration of DNN may be completed per the established 3GPP standard procedures and/or according to any known or to be developed procedure. This DNN may have an identifier (name associated therewith, e.g., dnn_name).

At step 412, UPF 406 registers with NRF 408 using for example, a NFRegister operation that includes NF Instance ID, NFProfile, and a list of services provided by UPF 406. In one example, NFProfile has the list of DNN and associated mobile IP addresses. NRF will then store the DNN and mobile IP addresses inside its database.

At step 414, NRF 408 sends a message back to UPF 406 (e.g., 201 Created) message confirming registration of UPF 406 with NRF 408.

At step 416, UPF 406 may generate (construct) query parameters with values (e.g., nf-type=upf; dnn=dnn_name) for in order to receive information on this particular DNN (e.g., having the name dnn_name) configured on any other UPF in the network.

At step 418, UPF 406 can use NFPRofileRetrieval procedure to send the query parameters to NRF 408.

At step 420, as a response to the query at step 458, UPF 406 receives, from NRF 408, NFProfile with DnnUpfInfoItem information which includes DNNs (having the name dnn_name) configured on other UPFs in the network as well as associated mobile IP subnet addresses of other UPFs with DNN having the name dnn_name configured thereon.

Based on the mobile IP address subnets received as part of the response at step 420, at step 422, UPF 406 dynamically generates (constructs) an ACL to be applied to the respective DNN. Once UEs in the network are assigned addresses from the IP address subnets, communications between such UEs may be blocked using the ACL.

At step 424, a session between UE 402 and gNB 404 may be established and user plane data packets may start to flow, resulting in IP packets to be sent from UE 402 to gNB 404 at step 426 and then from gNB 404 to UPF 406 at step 428 (e.g., inside GTP-U).

At step 430, UPF 406 applies the ACL to the DNN to block mobile to mobile communication, between UEs having been assigned IP addresses from among the IP address subnets, based on the destination IP defined in the ACL while allowing mobile to internet or application server (e.g., application server 312 of FIG. 3) communications.

In one example, NFProfileRetriaval is used as part of the flow of step 418. However, the present disclosure is not limited thereto and the NFProfile can be achieved as part of NFDiscovery.

Figure 5:
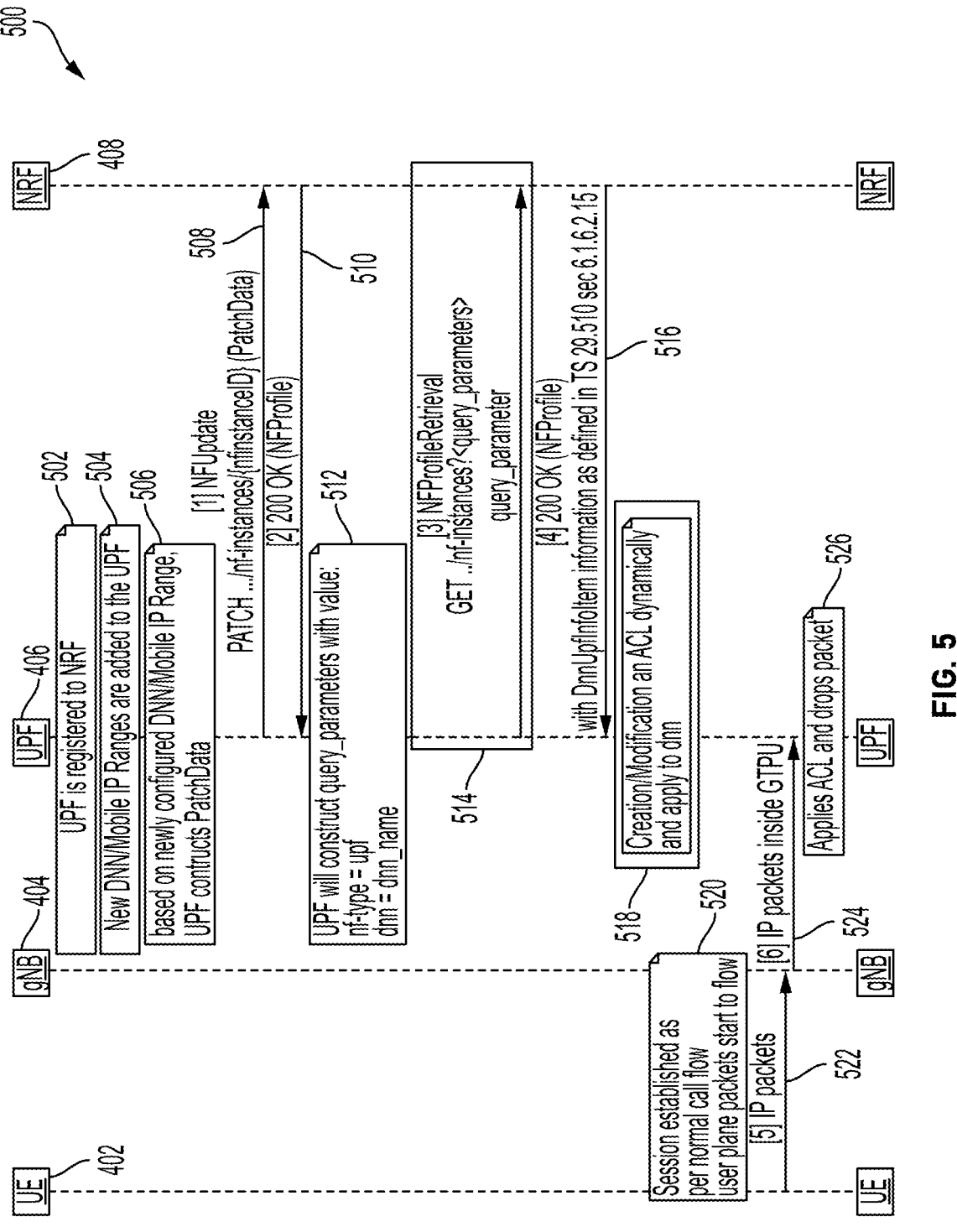
FIG. 5 illustrates dynamic ACL generation when DNN and or mobile addresses are added to a UPF after UPF registration with a 5G NRF, according to some aspects of the present disclosure.

FIG. 5 illustrates dynamic ACL generation when DNN and or mobile addresses are added to a UPF after UPF registration with a 5G NRF, according to some aspects of the present disclosure.

Example flow 500 illustrates various steps between UE 402, access point (e.g., gNB 404), UPF 406 and NRF 408, described above with reference to FIG. 4. Steps of example flow 500 will be described next.

At step 502, UPF 406 registers with NRF 408 per normal procedures as defined in the 3GPP standards and/or according to any known or to be developed procedure.

At step 504, new DNN and/or new mobile IP address subnets (ranges) may be added to UPF 406. This may be due to any number of reasons such as a new application server being added by a service provider to the underlying network, more UEs (e.g., IoTs) being added to the network, etc. This DNN may have an identifier (name associated therewith, e.g., dnn_name).

At step 506 and based on newly configured DNN and/or mobile IP addresses, UPF 406 generates (constructs) Patch-Data as a body of a message and sends the same using PATCH procedure to NRF 408, at step 508. In one example, PatchData will have the updated information of DNN and/or mobile IP Address subnets added at step 504.

In some examples, instead of using PATCH, a PUT procedure may be used.

At step 510, UPF 406 receives an acknowledgement from NRF 408.

At step 512, UPF 406 utilizes NFPRofileRetrieval procedure to construct a query parameter with nf-type as upf and dnn having the name dnn_name, for all DNNs configured on other UPFs in the network having the same name, in the same manner as described above with reference to step 416.

At step 514, UPF 406 can use NFPRofileRetrieval procedure to send the query parameters to NRF 408.

At step 516, as a response to the query at step 458, UPF 406 receives, from NRF 408, NFProfile with DnnUpfInfoItem information which contains DNNs having the name dnn_name and associated mobile IP address subnets.

At step 518, based on the mobile IP address subnets received at step 516, UPF 406 dynamically updates an ACL and apply this ACL to the respective DNN.

Steps 520, 522, 524, and 526 are the same as steps 424, 426, 428, and 430 of FIG. 4, respectively, and hence will not be further described for sake of brevity.

Figure 6:
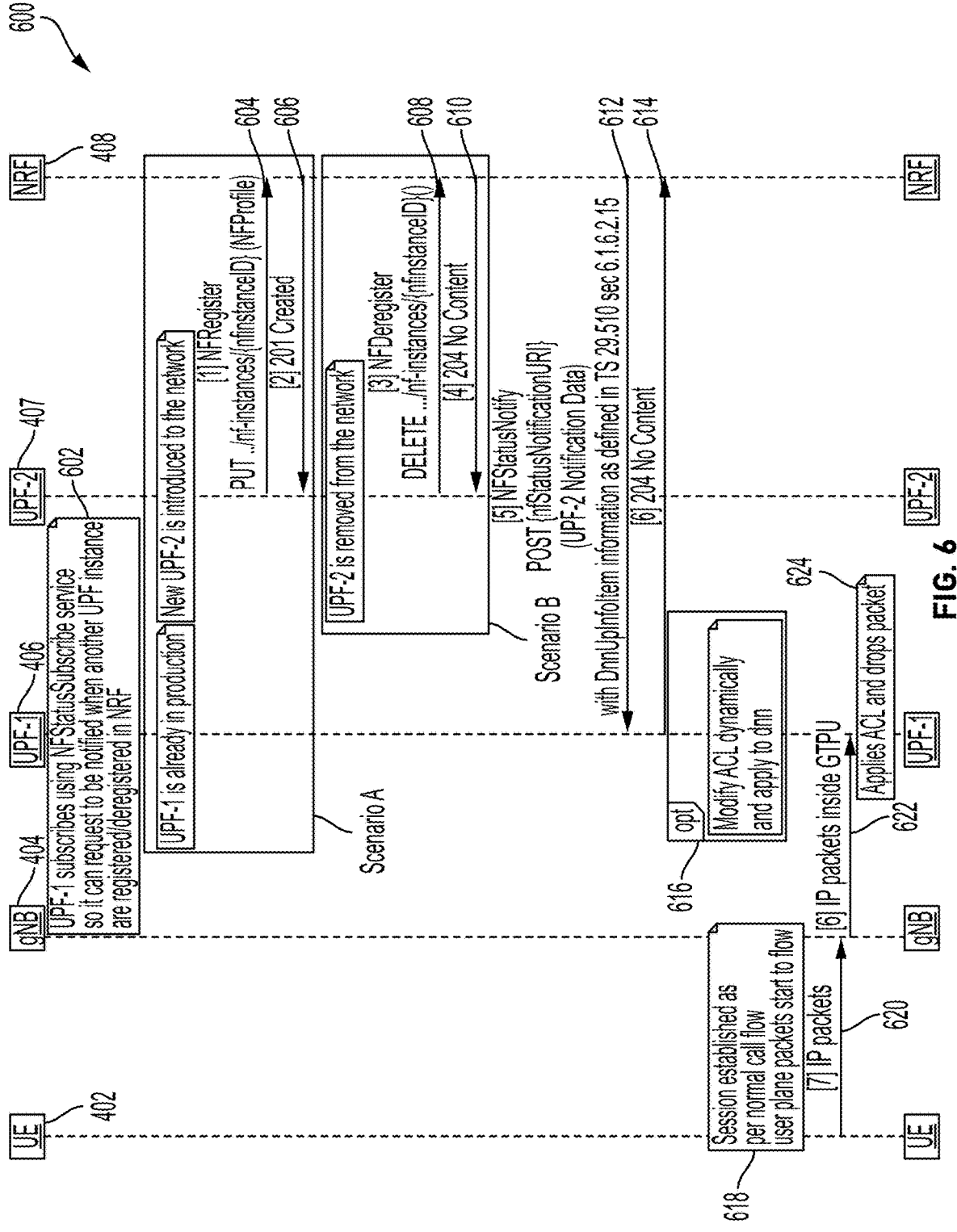
FIG. 6 illustrates dynamic ACL generation when a serving UPF for a given DNN is modified, according to some aspects of the present disclosure.

FIG. 6 illustrates dynamic ACL generation when a serving UPF for a given DNN is modified, according to some aspects of the present disclosure.

Example flow 600 illustrates various steps between UE 402, access point (e.g., gNB 404), UPF 406, UPF 407, and NRF 408, described above with reference to FIG. 4.

A UPF may be added to or removed from serving a given DNN (e.g., having a name dnn_name). In the non-limiting example of FIG. 6, both scenarios are illustrated and will be described below.

At step 602, assuming UPF 406 is already registered with NRF 408, UPF 406 subscribes to NRF 408 using NFStatusSubscribe service, which can trigger a notification when an update occurs on NRF 408 (e.g., when another UPF instance is registered with and/or deregisters with NRF 408).

At step 604 (and with UPF 406 already registered with NRF 408), UPF 407 registers with NRF 408 in the same manner as described above with reference to step 412 of FIG. 4. Step 606 is also the same as step 414 of FIG. 4. Hence steps 604 and 606 will not be further described for sake of brevity. This is one of the scenarios mentioned above (scenario A shown in FIG. 6).

A notification of registration of UPF 407 is subsequently sent by NRF 408 to UPF 406 due to NFStatusSubscribe service to which UPF 406 subscribed at step 602. This occurs at step 612 (e.g., using POST procedure as shown in FIG. 6).

In another scenario (scenario B shown in FIG. 6), both UPF 406 and UPF 407 are registered with NRF 408 but now, UPF 407 is removed (deregistered with NRF 408). This occurs at step 608 using NFDeregister procedure.

At step 610, deregistration of UPF 407 is acknowledged by NRF 408 back to UPF 407, a notification of which is subsequently sent by NRF 408 to UPF 406 due to NFStatusSubscribe service to which UPF 406 subscribed at step 602. This notification occurs at step 612 (e.g., using POST procedure as shown in FIG. 6).

Scenarios A and B are described together in the context of FIG. 6 for sake of a complete discussions. However, in some examples, only of the two scenarios can be occur in the context of FIG. 6.

At step 612, in addition to the notification regarding registration of a new UPF and/or deregistration of an existing UPF, UPF 406 receives, from NRF 408, NFProfile with DnnUpfInfoItem information which contains DNNs (e.g., having a one or more names of interest such as dnn_name) and associated mobile IP address subnets.

At step 614, UPF 406 may acknowledge the notification back to NRF 408.

At step 616, based on the mobile IP address subnets added/removed as part of NFStatusNotify due to UPF addition (scenario A) or UPF removal (scenario B), UPF 406 dynamically updates an ACL and apply this ACL to the respective DNN, in the same way as described above with reference to step 518 of FIG. 5.

Steps 618, 620, 622, and 624 are the same as steps 424, 426, 428, and 430 of FIG. 4, respectively, and hence will not be further described for sake of brevity.

Figure 7:
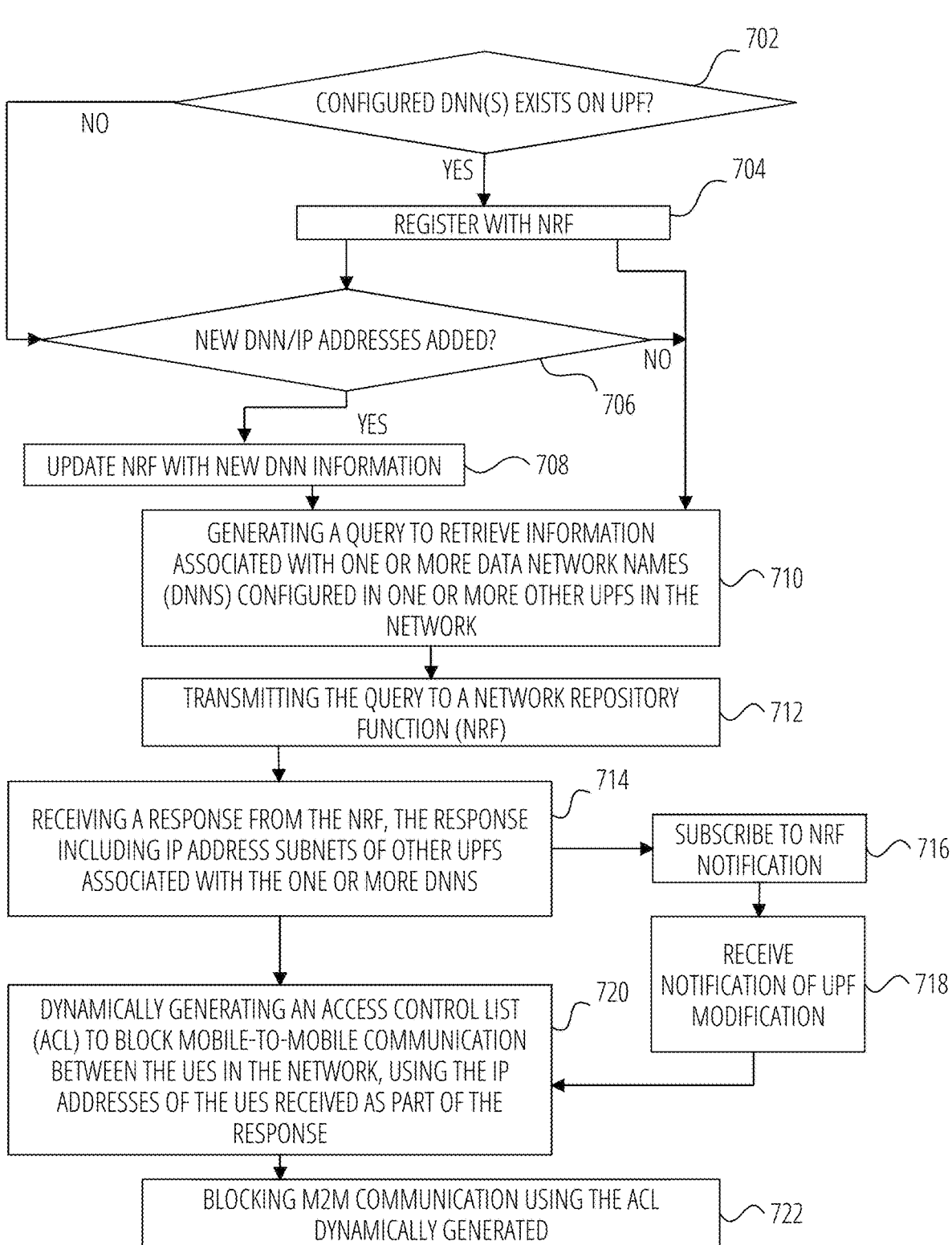
FIG. 7 illustrates an example method of dynamic ACL creation, according to some aspects of the present disclosure.

FIG. 7 illustrates an example method of dynamic ACL creation, according to some aspects of the present disclosure. Steps of FIG. 7 will be described from the perspective of UPF 406. It should be understood that one or more network components may execute computer-readable instructions stored on one or more associated memories to implement functionalities of UPF 406 including steps described below.

FIG. 7 is a non-limiting example embodiment that encompasses the three example cases described above with reference to FIGS. 4-6.

At step 702, UPF 406 determines if new DNN and associated IP address subnets are configured on UPF 406 or not, in the same manner as described above with reference to step 410 of FIG. 4. If not, the process proceeds to step 706, which will be described below.

If new DNN(s) and associated IP address subnets are configured on UPF 406, at step 704, UPF 406 registers with NRF 408 in the same manner as described above with reference to steps 412 and 414 of FIG. 4.

After step 704, UPF 406 may perform two separate functions either simultaneously or in a sequence. One such function is determining whether any new DNN and/or associated IP address subnets are added to (configured on) UPF 406 or not. This step may be performed in the same manner as described above with reference to step 504 of FIG. 5.

The other function is generating a query, at step 710, which will be described below.

If at step 706, UPF 406 determines that new DNN and associated IP address subnets are added to UPF 406, then at step 708, UPF 406 updates NRF 408 in the same manner as described above with reference to steps 508 and 510 of FIG. 5.

If at step 706, UPF 406 determines that no new DNN is added, then the process proceeds to step 710.

At step 710, UPF 406, may generate a query to retrieve information associated with one or more Data Network Names (DNNs) configured in other UPF(s) in the network, in the same manner as described above with reference to examples of FIGS. 4-6 (e.g., step 416 of FIG. 4, step 512 of FIG. 5, etc.).

At step 712, UPF 406 may transmit the query to NRF 408 in the same manner as described above with reference to steps 418 of FIG. 4 and 514 of FIG. 5.

At step 714, UPF 406 may receive a response from NRF 408. The response can include IP address subnets of all UPFs associated with the one or more DNNs, that can then be assigned to UEs (e.g., IoTs). This step may be performed in the same manner as described above with reference to step 420 of FIG. 4, 516 of FIGS. 5, and 612 of FIG. 6.

After step 714, UPF 406 may perform two separate functions either simultaneously or in a sequence. One such function is subscribing to receive notification of any modification to UPFs associated with the one or more DNNs, as described with reference to FIG. 6. This process may be performed at step 716. The other function is dynamic generation of ACL, which will be described below with reference to step 720.

At step 716, UPF 406 may subscribe to NRF notification to receive updates on any modification to UPF(s) associated with the one or more DNNs, as described above with reference to steps 602-610 of FIG. 6.

At step 718, UPF 406 may receive a notification from NRF 408 of any modification (addition of one or more new UPFs and/or removal of one or more existing UPFs in connection with the one or more DNNs). This may be performed in the same manner as steps 612 and 614 of FIG. 6. Thereafter, the process proceeds to step 720.

At step 720, UPF 406 may dynamically generate an ACL to block M2M communications using the IP address subnets of UEs received as part of the response at step 714 and/or the notification received at step 718.

At step 722, UPF 406 may block M2M communication using the ACL dynamically generated. This step may be the same as steps 424-430 of FIG. 4, steps 520-526 of FIG. 5, and steps 618-624 of FIG. 6).

Figure 8:
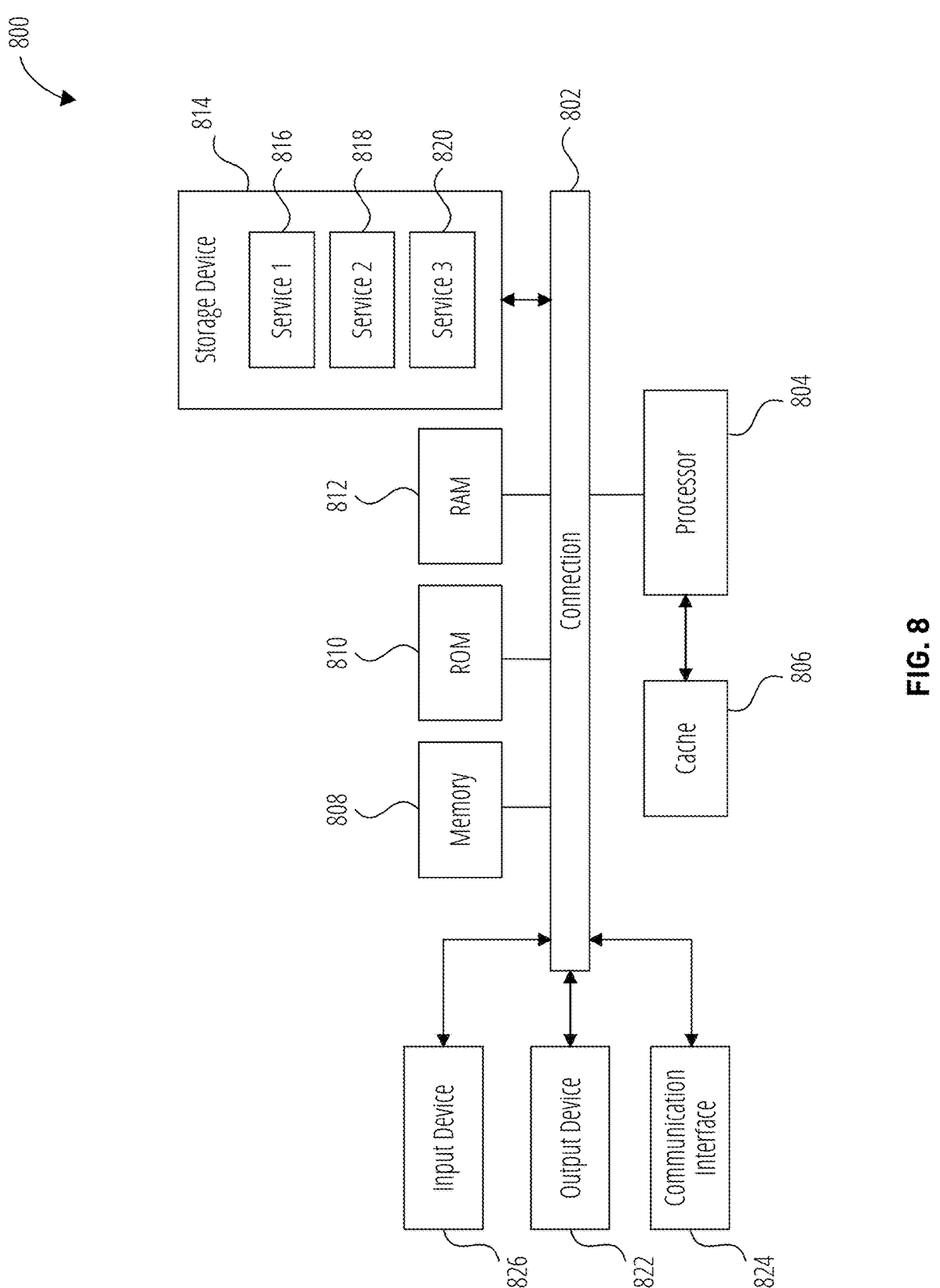
FIG. 8 shows an example of a computing system, according to some aspects of the present disclosure.

FIG. 8 shows an example of a computing system, according to some aspects of the present disclosure. Computing system 800 can be for example any computing device making up client endpoints 116 or virtual machines 106 or UEs 306, 308, 310, 402, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random-access memory (RAM) 812 to processor 804. Computing system 800 can include a cache of high-speed memory 806 connected directly with, in close proximity to, or integrated as part of processor 804.

Processor 804 can include any general-purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

generating, using a User Plane Function (UPF) of a core element of a network, a query to retrieve information associated with one or more Data Network Names (DNNs) configured in at least one other UPF in the network;

transmitting the query to a Network Repository Function (NRF);

receiving a response from the NRF, the response including IP address subnets of the at least one other UPF associated with the one or more DNNs;

dynamically generating an Access Control List (ACL) to block mobile-to-mobile communication between User Equipment (UEs) in the network, using the IP address subnets received as part of the response, wherein each of the UEs is assigned an IP address from among the IP address subnets; and blocking M2M communication using the ACL dynamically generated.

2. The method of claim 1, further comprising:

configuring the one or more DNNs on the UPF when the UPF is not registered with the NRF.

3. The method of claim 1, further comprising:

adding the one or more DNNs to the UPF after registering the UPF with the NRF.

4. The method of claim 3, further comprising:

updating the NRF with information associated with the one or more DNNs.

5. The method of claim 1, further comprising:

subscribing to the NRF to receive notifications of at least one modification to UPFs associated with the one or more DNNs; and receiving a notification from the NRF, the notification being one of a registration notification of a new UPF associated with the one or more DNNs or a deregistration notification of an existing UPF associated with the one or more DNNs.

6. The method of claim 5, wherein the ACL is generated based on the response and the notification.

7. The method of claim 5, wherein the UPF subscribes to the NRF to receive the notifications using NFStatusSubscribe service to receive the registration notification and the deregistration notification.

8. A network component configured to implement User Plane Function (UPF) of a 5G network, comprising:

one or more memories having computer-readable instructions stored therein; and one or more processors configured to execute the computer-readable instructions to:

generate a query to retrieve information associated with one or more Data Network Names (DNNs) configured in at least one other UPF in the 5G network;

transmit the query to a Network Repository Function (NRF);

receive a response from the NRF, the response including IP address subnets of the at least one other UPF associated with the one or more DNNs;

dynamically generate an Access Control List (ACL) to block mobile-to-mobile communication between User Equipment (UEs) in the 5G network, using the IP address subnets received as part of the response, wherein each of the UEs is assigned an IP address from among the IP address subnets; and block M2M communication using the ACL dynamically generated.

9. The network component of claim 8, wherein the one or more processors are further configured to execute the computer-readable instructions to:

configure the one or more DNNs on the UPF when the UPF is not registered with the NRF.

10. The network component of claim 8, wherein the one or more processors are further configured to execute the computer-readable instructions to:

add the one or more DNNs to the UPF after registering the UPF with the NRF.

11. The network component of claim 8, wherein the one or more processors are further configured to execute the computer-readable instructions to:

update the NRF with information associated with the one or more DNNs.

12. The network component of claim 11, wherein the one or more processors are further configured to execute the computer-readable instructions to:

subscribe to the NRF to receive notifications of at least one modification to UPFs associated with the one or more DNNs; and receive a notification from the NRF, the notification being one of a registration notification of a new UPF associated with the one or more DNNs or a deregistration notification of an existing UPF associated with the one or more DNNs.

13. The network component of claim 12, wherein the ACL is generated based on the response and the notification.

14. The network component of claim 12, wherein the UPF subscribes to the NRF to receive the notifications using NFStatusSubscribe service to receive the registration notification and the deregistration notification.

15. One or more non-transitory computer-readable media comprising computer-readable instructions, which when executed by one or more processors of a network component configured to implement User Plane Function (UPF) of a 5G network, cause the network component to:

generate a query to retrieve information associated with one or more Data Network Names (DNNs) configured in at least one other UPF in the 5G network;

transmit the query to a Network Repository Function (NRF);

receive a response from the NRF, the response including IP address subnets of the at least one other UPF associated with the one or more DNNs;

dynamically generate an Access Control List (ACL) to block mobile-to-mobile communication between User Equipment (UEs) in the 5G network, using the IP address subnets received as part of the response, wherein each of the UEs is assigned an IP address from among the IP address subnets; and block M2M communication using the ACL dynamically generated.

16. The one or more non-transitory computer-readable media of claim 15, wherein the execution of the computer-readable instructions further cause the network component to:

configure the one or more DNNs on the UPF when the UPF is not registered with the NRF.

17. The one or more non-transitory computer-readable media of claim 15, wherein the execution of the computer-readable instructions further cause the network component to:

add the one or more DNNs to the UPF after registering the UPF with the NRF.

18. The one or more non-transitory computer-readable media of claim 15, wherein the execution of the computer-readable instructions further cause the network component to:

subscribe to the NRF to receive notifications of at least one modification to UPFs associated with the one or more DNNs; and receive a notification from the NRF, the notification being one of a registration notification of a new UPF associated with the one or more DNNs or a deregistration notification of an existing UPF associated with the one or more DNNs.

19. The one or more non-transitory computer-readable media of claim 18, wherein the ACL is generated based on the response and the notification.

20. The one or more non-transitory computer-readable media of claim 18, wherein the UPF subscribes to the NRF to receive the notifications using NFStatusSubscribe service to receive the registration notification and the deregistration notification.

\* \* \* \* \*